Feb. 7, 1950     A. L. AYERS     2,496,615
WHEEL AND WHEEL MOUNTING
Filed Aug. 26, 1946
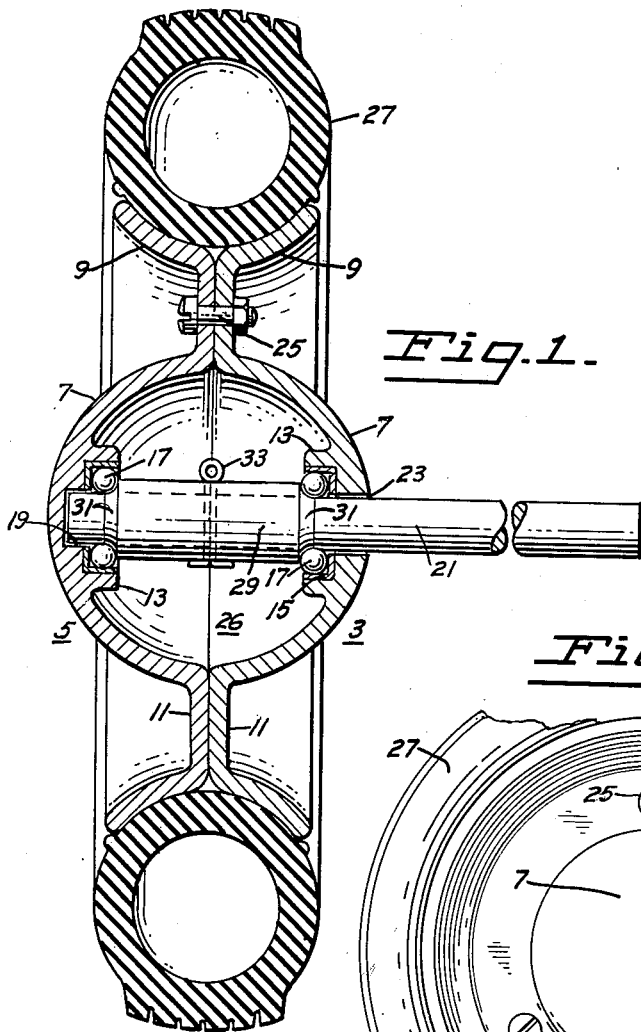
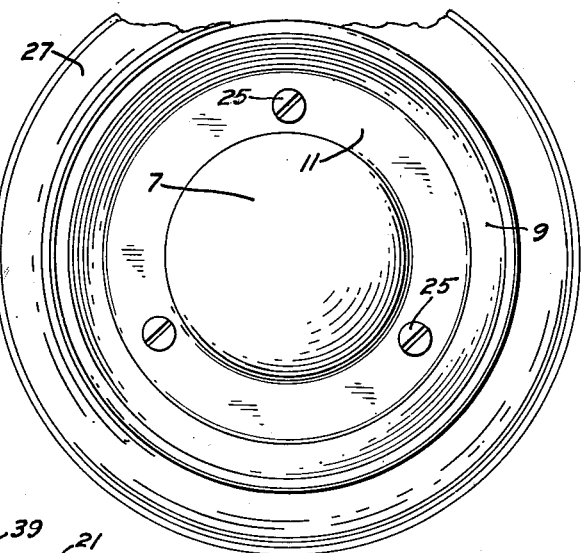
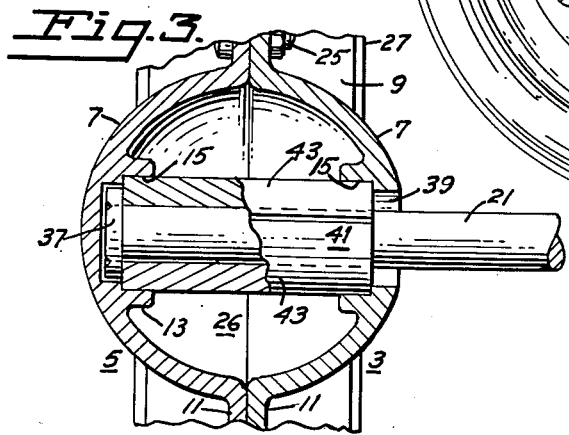
INVENTOR.
ALLYN L. AYERS
BY Charles O. Bruce
ATTORNEY Patented Feb. 7, 1950

2,496,615

UNITED STATES PATENT OFFICE 2,496,615

WHEEL AND WHEEL MOUNTING

Allyn L. Ayers, Oakland, Calif., assignor to Ralph B. Ensminger and Enid L. Ensminger, as joint tenants Application August 26, 1946, Serial No. 693,108

3 Claims. (Cl. 301—111)

My invention relates to wheels, and more particularly to a wheel and wheel mounting adaptable for use on wheeled toys, hand trucks, small motor trucks, hospital beds, etc.

Among the objects of my invention are:

(1) To provide a novel and improved wheel and wheel mounting for use on wheeled toys, small trucks, beds and the like;

(2) To provide a novel and improved wheel with demountable tires;

(3) To provide a novel and improved wheel of the demountable tire type wherein the mounting of such tire is readily accomplished;

(4) To provide a novel and improved wheel and wheel mounting requiring no exposed or protruding axle nuts, cotterpins or the like to hold such wheel securely on its axle;

(5) To provide a novel and improved wheel and wheel mounting of strong and durable construction, capable of being economically manufactured.

Additional objects of my invention will be brought out in the following description of a preferred embodiment of the same, taken in conjunction with the accompanying drawing wherein—

Figure 1 is a view in section through a wheel and wheel mounting embodying the features of my invention in its preferred form;

Figure 2 is a side elevational view of such wheel;

Figure 3 is a fragmentary view in section through a modified form of my invention.

Basically, the wheel of the present invention is designed to include a central housing for receiving the end of an axle on which such wheel is to be mounted, and means is included within the housing for locking the wheel to the axle whereby the use of exposed axle nuts and cotter pins is avoided.

More specifically and according to the preferred form illustrated in Figure 1, the wheel is formed of an inner and outer section 3 and 5 respectively, both preferably similar in construction and each comprising a central substantially hemispherical housing section 7 and an angularly disposed rim flange 9 integrally united to its associated housing section by an intermediate web 11.

Each housing section is preferably fabricated with an inside central boss 13 initially formed with a stepped recess, the inner or larger diameter portion 15 constituting a bearing recess for the reception of a ball bearing assembly 17. In the outer wheel section 5 the smaller diameter portion 19 of the boss recess is adapted to accommodate the end of an axle 21 on which the wheel is to be mounted, while with regard to the inner wheel section 3, the smaller diameter portion of the boss recess constitutes a guide in drilling an axle opening 23 for the passage of such axle into the housing section.

Both wheel sections may be joined along the webs with such bearing recesses facing each other, by means of bolts 25 through said webs at spaced points therearound. When thusly assembled, the two housing sections 7 form a central housing 26, while the outwardly directed rib flanges 9 cooperate to form a tire groove for holding a tire 27, preferably one of the semi-pneumatic type.

In mounting a wheel on an axle, it is built up as an assembly thereon. The inner half 3 is first slipped over the end of the axle 21, followed by a bearing assembly 17 which nests within the bearing recess 15. A spacer sleeve 29 having an edge groove 31 at each end to provide a complementary fit with each bearing assembly, is then slipped over the end of the axle in functional relationship with the bearing assembly and held in such position by a cotter pin 33 passing diametrically through the sleeve and axle. The outer wheel section 5 with its bearing assembly 17 installed, is then assembled onto the end of the axle, preferably after first supporting a tire in position to be engaged between the flanges 9 of both wheel sections as the outer section is brought into position for bolting to the inner section by the web bolts 25. When thus bolted, the wheel and the wheel mounting are complete, and at this point it is noted that the cotter pin functions as a means within the housing for precluding withdrawal of the axle from the wheel or, in other words, for positively holding the wheel on the shaft or axle and precluding accidental removal thereof.

For lubrication, the bearings may be pre-packed with grease or they may be oiled by way of the axial opening 23 through which the axle enters the housing of the wheel. If desired, the wheel may very conveniently be adapted for pressure lubrication, in which case, the inner half section preferably of the housing is provided with a lubrication fitting, and a suitable or conventional seal or packing gland is added about the shaft where it passes through the axial opening, to preclude leakage of lubricant therethrough.

Where economy of manufacture dictates the use of a less expensive type of bearing means, such for example as a bronze bearing, in lieu of the ball bearing assembly previously disclosed, the conversion may be made while utilizing basic wheel sections similar to those previously described above except that the smaller diameter portion of the boss recess will be somewhat larger to accommodate in the outer wheel section, the end of the axle which will have affixed thereto, as by welding, a metal washer 37, while determining a larger axle opening 39 in the inner section of the wheel to permit passage of such washer.

The bearing 41 is of cylindrical shape and formed of two semi-cylindrical or half sections 43. These are assembled on the axle following the application of the inner half section of the wheel thereon, and then forced into the bearing recess of such wheel section. This will serve to temporarily hold the bearing half sections in assembled relationship on the axle until the remaining wheel components can be assembled. Upon bolting the two wheel sections together, the wheel and its mounting then become complete and in this embodiment it is important to note that the washer which has been affixed to the end of the axle, serves to hold the wheel to the axle and preclude accidental removal of the wheel therefrom.

Any of the lubrication expedients previously mentioned in regard to the wheel of Figure 1 is applicable to the embodiment of Figure 3.

Either of the embodiments of the invention described produces a very strong and rugged wheel and wheel mounting which securely holds the wheel on the axle and in such a manner as to require no exposed axle nuts or cotter pins, thereby permitting the design of a wheel which shall not only be very pleasing to the eye but which shall be safe in the use thereof.

Both wheel sections are basically identical, permitting them to be cast or stamped with the same mold or dies, thus considerably reducing the cost of manufacture of such wheels from what they otherwise would be.

One or more gaskets of paper or the like may be clamped between the webs in originally assembling the wheel, whereby the removal thereof will provide for take up to compensate for end wear in the spacer sleeve of Figure 1 or the bearing of Figure 3.

Although it is within the contemplation of my invention to make the two wheel sections of different design or shape, such changes need not alter the principal features of my invention.

Accordingly, while I have disclosed and described my invention in its preferred form, and in great detail, I do not desire to be limited in my protection to such details, except as may be necessitated by the appended claims.

I claim:

1. A wheel and wheel mounting comprising a wheel having a central housing, said central housing including therein a pair of opposed axially disposed bearing recesses each such recess being defined by a circular flange of less diameter than said central housing and directed inwardly from a wall of said central housing, and an axial opening into said housing of less diameter than said bearing recesses for the passage of an axle into said housing; bearing means in said bearing recesses; an axle having one end cylindrically fitted within said bearing means to preclude lateral displacement of said axle in said bearing means; and means within said housing holding said axle against withdrawal from said bearing means.

2. A wheel and wheel mounting comprising a wheel having a central housing, said central housing including therein a pair of opposed axially disposed bearing recesses each such recess being defined by a circular flange of less diameter than said central housing and directed inwardly from a wall of said central housing, and an axial opening into said housing of less diameter than said bearing recesses for the passage of an axle into said housing; a ball bearing assembly in each of said bearing recesses; an axle having one end extending into said housing and cylindrically fitted in said ball bearing assemblies to preclude lateral displacement of said axle in said ball bearing assemblies; and means within said housing holding said axle against withdrawal from said ball bearing assemblies, said means including a spacer sleeve about said axle between said ball bearing assemblies and a pin in said sleeve and said axle.

3. A wheel and wheel mounting comprising a wheel having a central housing, one side of said central housing including therein an axially disposed recess including a large diameter bearing recess and a smaller diameter portion, the other side of said central housing including an opposing bearing recess and an axial opening into said housing of less diameter than said bearing recess for the passage of an axle into said housing; bearing means in said bearing recesses; an axle extending through said axial opening and into said housing; a sleeve bearing about said axle within said housing and supported with its ends in said bearing recesses; and means at the tip of said axle precluding withdrawal of said axle from said sleeve bearing.

ALLYN L. AYERS.

REFERENCES CITED

The following references are of record in the file of this patent:

UNITED STATES PATENTS

| Number | Name | Date |
|---|---|---|
| 2,075,271 | Coldwell | Mar. 30, 1937 |
| 2,175,646 | Replogle | Oct. 10, 1939 |

FOREIGN PATENTS

| Number | Country | Date |
|---|---|---|
| 289,697 | Italy | Oct. 24, 1931 |
| 438,963 | Great Britain | Nov. 22, 1935 |
| 667,536 | Germany | Nov. 14, 1938 |